United States Patent

[11] 3,577,014

[72] Inventors George M. Low
Deputy Administrator of the National Aeronautics and Space Administration with respect to an invention of;
Robert W. O'Neill, 5218 DeMilo, Houston, Tex. 77018

[21] Appl. No. 53,156
[22] Filed July 8, 1970
[45] Patented May 4, 1971

[54] MONOSTABLE MULTIVIBRATOR WITH COMPLEMENTARY NOR GATES
8 Claims, 2 Drawing Figs.

[52] U.S. Cl. .......... 307/273, 307/215, 307/265, 328/92, 328/207
[51] Int. Cl. .......... H03k 3/26, H03k 18/34
[50] Field of Search .......... 307/273, 215, 279, 304, 265; 328/207, 92

[56] References Cited

UNITED STATES PATENTS 3,509,379 4/1970 Rapp .......... 307/279

OTHER REFERENCES

Pub. I " Field-Effect Transistors— Part 3 Applications" in ELECTRONICS, Dec. 28, 1964, pages 55 to 58 & FIGS. on page 57 are pertinent.

*Primary Examiner*—Stanley D. Miller, Jr.
*Attorneys*—Marvin J. Marnock, Marvin F. Matthews and John R. Manning

ABSTRACT: First and second positive NOR complementary Mos gates are employed to form a monostable multivibrator circuit in which the output of the first gate forms the input to the second gate and the output of the second gate forms the system output. The trigger signal supplied to the gates is differentiated through a resistance-capacitance circuit and supplied to the first gate. The differentiated signal may be bypassed across the first gate through a semiconductor diode to the input of the second gate to permit narrow pulse width outputs to reduce input pulse power and to increase the duty cycle of the circuit. A feedback capacitor connected across both gates is employed in an internal resistance-capacitance circuit to provide the time constant for the multivibrator.

In a modified form, a plurality of monostable multivibrator circuits are employed together to generate a sequence of control pulses in a date processor.

Robert W. O'Neil
INVENTOR

MONOSTABLE MULTIVIBRATOR WITH COMPLEMENTARY NOR GATES

The invention described herein was made in the performance of work under a NASA Contract and is subject to the provisions of Section 305 of the National Aeronautics and Space Act of 1958, Public Law 85-568 (72 Stat. 435, 42 U.S.C. 2457).

BACKGROUND OF THE INVENTION

1. Field of the Invention

The present invention relates to electronic signal-producing means. More specifically, the present invention relates to a new and improved, monostable multivibrator designed to provide a wide range of output pulse widths with reduced input trigger pulse power and increased duty cycle. In a specific form, the multivibrator of the present invention is adapted to be employed to interface instrument data to the onboard telemetry in a spacecraft.

2. Brief Description of the Prior Art

A multivibrator is generally a two-stage amplifier with positive feedback. The monostable multivibrator switches to an unstable state upon being triggered and remains in this state for a predetermined period of time before returning to its original stable state. This basic principle has been incorporated in a variety of circuit schemes for generating time delay pulses, or for standardizing pulses of random widths.

The prior art circuits presently being employed to achieve the foregoing functions are objectionable for use in many space travel and exploration programs to the extent that they require excessive power, have only a limited duty cycle and have a relatively small range of output pulse widths.

SUMMARY OF THE INVENTION

The complementary monostable multivibrator of the present invention employs a pair of positive NOR gates which are coupled together with the output of the first gate forming one input to the second gate and the output of the second gate forming the system output. An input capacitive-resistive circuit differentiates the trigger pulse derived from a driver circuit and supplies it as one input to the first NOR gate. A semiconductor diode couples the differentiated trigger pulse to the output of the first NOR gate to permit rapid differentiation of the input pulse which increases the duty cycle of the circuit, permits the multivibrator to form a narrow pulse width output and to allow a reduction in the requirements for input pulse power. A feedback capacitor connected across both gates acts with a resistance to provide the time constant for the output signal generated by the multivibrator. Protective semiconductor devices are employed to regulate the voltage difference across capacitors employed in the multivibrator system.

With the monostable multivibrator of the present invention, a wide range of output pulse widths are obtainable, power consumption is reduced, and relatively large duty cycles are attainable.

The foregoing and other features and advantages of the present invention will become more readily apparent from the following specification, drawings and claims.

DESCRIPTION OF THE PREFERRED EMBODIMENTS

Figure 1:
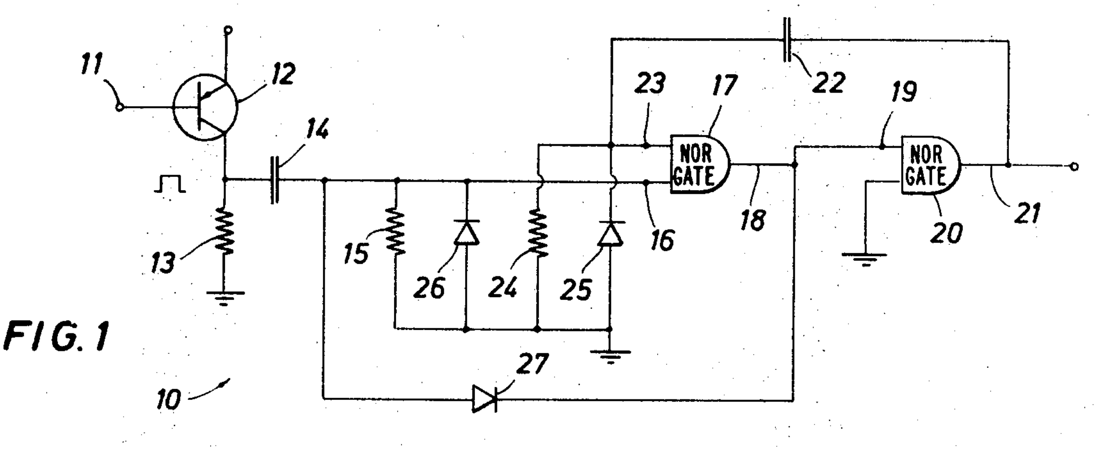
FIG. 1 is a schematic circuit diagram illustrating the complementary Mos monostable multivibrator of the present invention.

With reference to FIG. 1, the monostable multivibrator (one-shot multivibrator) of the present invention is indicated generally at 10. An input 11 is provided to the circuit through a conventional driver circuit which includes a transistor 12 and a grounded resistance 13. The voltage developed across the resistor 13 is coupled to the multivibrator circuit through an input differentiation circuit formed by a coupling capacitor 14 and a grounded resistance 15. The differentiated input signal developed across the resistance 15 is communicated to a first input 16 in a positive NOR complementary Mos gate 17. The output from the gate 17 is formed on an output line 18 and is conveyed to the first input 19 of a second Mos gate 20. The output from the gate 20 is formed on an output line 21 which provides the system output of the multivibrator 10.

The RC time constant for the multivibrator circuit 10 is provided by a feedback capacitor 22 connected between a second input 23 to the gate 17 and the output of the gate 20 and a resistance 24 connected between the input 23 and ground. A protective semiconductor diode 25 is connected between the input 23 to the gate 17 and ground to protect the gate 17 by limiting the voltage difference across the capacitor 22. A second protective semiconductor diode 26 is connected between the first input 16 to the gate 17 and ground to protect the gate 17 by limiting the voltage difference across the capacitor 14.

A bypassing, semiconductor diode 27 conveys the differentiated input trigger signal to the input 19 of the gate 20. As will be seen, the diode 27 is employed to discharge the input differentiating capacitor 14 through the output of the gate 17 and across the resistance 13 to enable the system to produce very narrow output pulses.

The circuit of FIG. 1 operates as follows. Before the occurrence of an input trigger pulse, both inputs to the gate 17 are at ground potential which corresponds to a logic 0 input. Since the gate 17 performs a NOR logic function, the occurrence of electrical signals corresponding to logic 0 at all of the inputs to the NOR gate produces an electrical output signal corresponding to logic 1 on the output line 18. The logic gate 20 on the other hand, before the occurrence of the input trigger pulse, has a logic 1 on the input 19 and a logic 0 on a second, grounded input terminal so that the output signal on the line 21 corresponds to a logic 0. The transistor 12 in the driver circuit of the multivibrator 10 is biased into conduction by applying a positive trigger pulse of sufficient amplitude to the base of the transistor. When biased into conduction, the current flow through the output resistance 13 produces a voltage signal which is coupled through the capacitor 14 to the input 16 of the gate 17.

The differentiated input trigger pulse applied to the input terminal 16 of the gate 17 corresponds to a logic 1 input to the gate which changes the output signal on the line 18 to a logic 0. The logic 0 signal is input to the gate 20 on the terminal 19 so that both inputs to the gate 20 produce a logic 0 which cause a logic 1 output to appear on the line 21.

The output on the line 21 remains at a voltage equivalent to logic 1 until the capacitor 22 charges to the extent required to form a logic 0 at the input 23 to the gate 17. The simultaneous occurrence of two logic 0's at the inputs 23 and 16 to the gate 17 produce a logic 1 on the output 18 so that the output of the gate 20 returns to a logic 0 thus terminating the output pulse.

Following occurrence of the initial input trigger pulse, the charging of capacitor 22 eliminates the need for the presence of a logic 1 on the input terminal 16 and the input trigger pulse is eliminated by the semiconductor diode 27 which conducts to charge the capacitor 14. This in turn returns the input signal on the input line 16 to the gate 17 to ground potential which corresponds to a logic 0 input on the terminal 16.

When the amplitude of the positive trigger pulse occurring at the base of the transistor 17 falls below a predetermined minimum value, the transistor ceases conducting and capacitor 14 begins to discharge through the input resistance 13 and the semiconductor diode 26. The discharge continues until the voltage across the capacitor 14 falls below the "ON" threshold of the diode 26. Subsequent discharge of the capacitor 14 is effected through the combined action of resistances 13 and 15.

In a specific construction of the circuit 10, RCA CD4001 gates are employed for the gates 17 and 20; Fairchild diodes 1N3064 were employed for the diodes 25, 26 and 27, the value of resistance 13 was 15 k. ohms, and resistances 15 and 24 were 100k. ohm resistances. The capacitor 14 had a rating of 100 picofarads and the rating of capacitor 22 was between 33 and 100 picofarads. The gates were supplied an operating voltage of 10—15 volts. In the specific construction, duty cycles of 95 percent were obtained and the output pulses of from 1 microsecond to several seconds were easily generated by proper selection of the values of the capacitor 22 and the resistor 24.

It may be understood that the gate 20 in the circuit 10 acts as an inverter when the second input is grounded in the manner illustrated in FIG. 1. If desired, the second input to the gate 20 may be connected to the input 19 without changing performance of the circuit. In addition, the RCA CD4001 gates are equipped with internal protection diodes so that if desired, the semiconductor diodes 25 and 26 may be omitted with the discharge paths for capacitors 14 and 22 being provided by the internal diodes within the gate 17.

Figure 2:
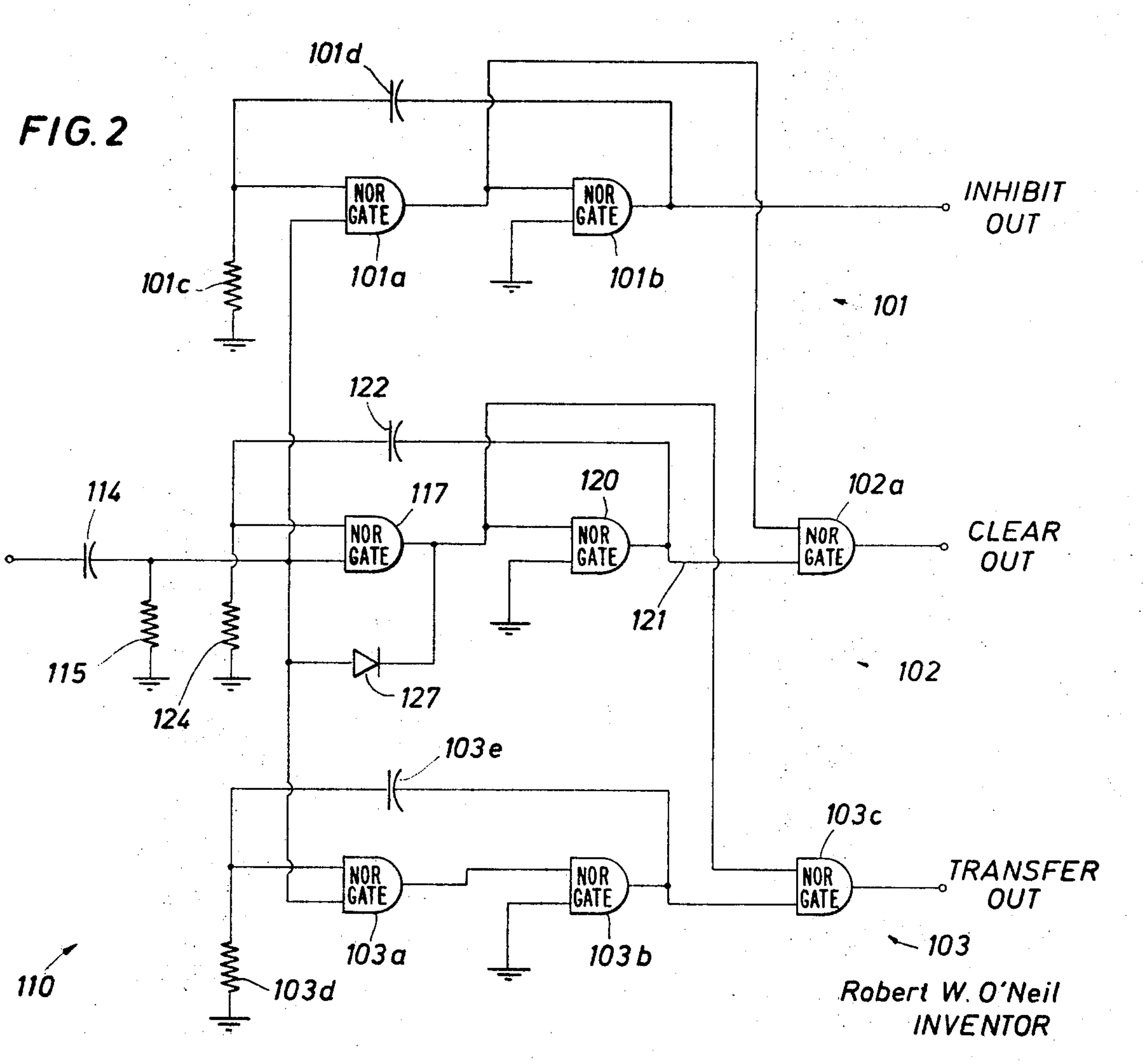
FIG. 2 is a schematic diagram illustrating the circuit of the present invention as employed for generating a sequence of logic pulses in a data processor.

Referring to FIG. 2, a modified form of the present invention is indicated generally at 110. The circuit 110 includes three monostable multivibrators indicated generally at 101, 102 and 103.

Reference characters identifying the components in the multivibrator 102 are increased by 100 above the reference characters in the corresponding components of FIG. 1. The circuitry of FIG. 2 is specifically adapted for use in an integral flux spectrometer circuit to interface instrument data to the onboard telemetry in a spacecraft. The gates illustrated in circuit 110 which have been designated as 101*a*, 101*b*, 117, 120, 102*a*, 103*a*, 103*b* and 103*c* are positive NOR complementary Mos gates such as the RCA CD4001 gates or equivalent. It will be understood that the protective function of the diodes 26 and 25 described earlier with reference to FIG. 1 is provided by internal protective diodes in the gates 101*a*, 117 and 103*a*.

A resistor 101*c* and a capacitor 101*d* provide the time constant for the multivibrator 101 while a similarly connected resistance 103*d* and a capacitance 103*e* provide the RC time constant for the multivibrator 103. In the specific form of the circuit for FIG. 2, the capacitor 101*d* is 100 picofarads, the capacitor 122 is 68 picofarads and the capacitor 103*e* is 33 picofarads. The resistance 101*c*, 124 and 103*d* are 100 k. ohms.

The circuit 110 functions to generate a sequence of control pulses to inhibit data, (multivibrator 101), transfer the data (multivibrator 102) and clear counters (multivibrator 103) for new data in a data processor designed to interface instrument data to telemetry. The three multivibrators 101, 102 and 103 are fired simultaneously and the outputs designated respectively in FIG. 2 as "inhibit out," "clear out" and "transfer out," are decoded to generate the pulse sequence. In practice, the inhibit pulse time duration is greater than the sum of the time duration of the "transfer out" and "clear out" pulses to prevent undesired counts during the transfer and reset cycles.

The foregoing disclosure and description of the invention is illustrative and explanatory thereof, and various changes in the size, shape and materials as well as in the details of the illustrated construction may be made within the scope of the appended claims without departing from the spirit of the invention.

I claim:

1. A monostable multivibrator circuit comprising:
   a. first and second gate means each having input and output means for forming a given electrical signal on their respective output means when a predetermined signal occurs in their respective input means;
   b. connecting means extending between said first and second gate means for conveying the signal on the output of said first gate means to the input means of said second gate means;
   c. time control feedback means extending between said input means of said first gate means and said output means of said second gate means for conveying an output-dependent feedback signal to said input of said first gate means for controlling the time duration of a signal appearing at the output of said second gate means; and
   d. bypass means extending between the input and output of said first gate means for bypassing said first gate means following onset of an input signal into said input means of said first gate means to produce small pulse width output signals at the output of said second gate means.
2. A monostable multivibrator circuit as defined in claim 1 wherein said gate means include first and second NOR gates.
3. A monostable multivibrator circuit as defined in claim 1 wherein said time control feedback means includes capacitive means.
4. A monostable multivibrator circuit as defined in claim 1 wherein said bypass means includes semiconductor diode means.
5. A monostable multivibrator circuit as defined in claim 2 wherein:
   a. said time control feedback means includes capacitive means; and
   b. said bypass means includes semiconductor diode means.
6. A monostable multivibrator as defined in claim 2 further including system input means connected to said input means of said first gate means for differentiating the system input signal to said multivibrator circuit.
7. A monostable multivibrator circuit as defined in claim 6 wherein:
   a. said time control feedback means includes capacitive means; and
   b. said bypass means includes semiconductor diode means.
8. A monostable multivibrator circuit as defined in claim 7 wherein said system input means includes resistive and capacitive means for differentiating said system input signal.